United States Patent [19]

Broome

[11] Patent Number: 4,746,244
[45] Date of Patent: * May 24, 1988

[54] APPARATUS FOR THE GENERATION OF HYDROELECTRIC POWER AND METHOD OF MANUFACTURING AND INSTALLING SAME

[75] Inventor: Kenneth R. Broome, Reading, Pa.

[73] Assignee: Williams and Broome, Inc., Exton, Pa.

[ * ] Notice: The portion of the term of this patent subsequent to Feb. 3, 1904 has been disclaimed.

[21] Appl. No.: 897,104

[22] Filed: Aug. 15, 1986

Related U.S. Application Data

[63] Continuation-in-part of Ser. No. 773,408, Sep. 6, 1985, abandoned, which is a continuation of Ser. No. 597,465, Apr. 6, 1984, Pat. No. 4,540,313.

[51] Int. Cl.⁴ .............................................. E02B 9/00
[52] U.S. Cl. ...................................... 405/78; 290/52; 405/75
[58] Field of Search ....................... 405/75, 78, 76, 77; 290/52, 43; 60/398

[56] References Cited

U.S. PATENT DOCUMENTS

| | | | |
|---|---|---|---|
| 4,117,676 | 10/1978 | Atencio | 405/78 X |
| 4,143,990 | 3/1979 | Atencio | 405/78 |
| 4,182,123 | 1/1980 | Ueda | 290/54 |
| 4,289,971 | 9/1981 | Ueda | 405/78 X |
| 4,364,228 | 12/1982 | Eller | 405/78 X |
| 4,476,396 | 10/1984 | Calvert | 405/78 X |
| 4,540,313 | 9/1985 | Broome | 405/75 X |

FOREIGN PATENT DOCUMENTS

| | | | |
|---|---|---|---|
| 14821 | 1/1904 | Australia | 405/78 |
| 19028 | 9/1914 | France | 405/78 |

Primary Examiner—Dennis L. Taylor
Attorney, Agent, or Firm—Weiser & Stapler

[57] ABSTRACT

A hydroelectric power generating plant includes separate barges upstream and downstream of a dam, and a siphoning penstock attached to and spanning between the barges to enable fluid communication over the dam and to appropriate power generating equipment. In constructing the power generating plant, the barges and penstock are constructed remotely at a convenient manufacturing facility and either floated to the dam site over water, or transported to the dam site over land. At the dam site the barges are positioned so as to span the dam, and moored in position, and the siphoning penstock is connected to and between the barges using trunnion supports which enable respective pivotal movement.

69 Claims, 6 Drawing Sheets

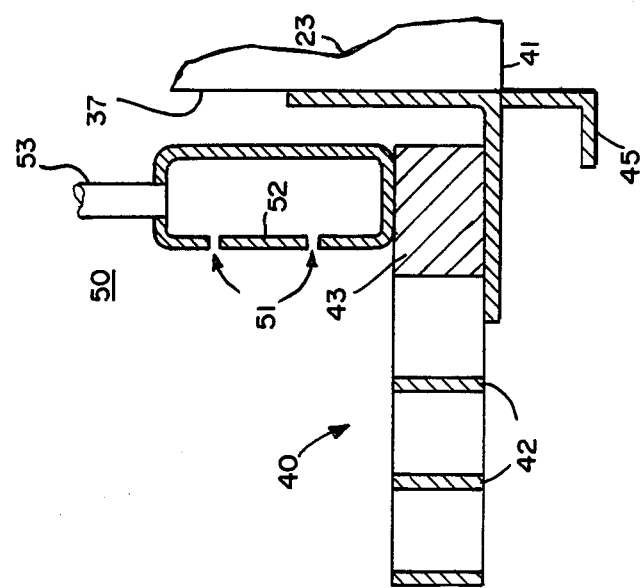
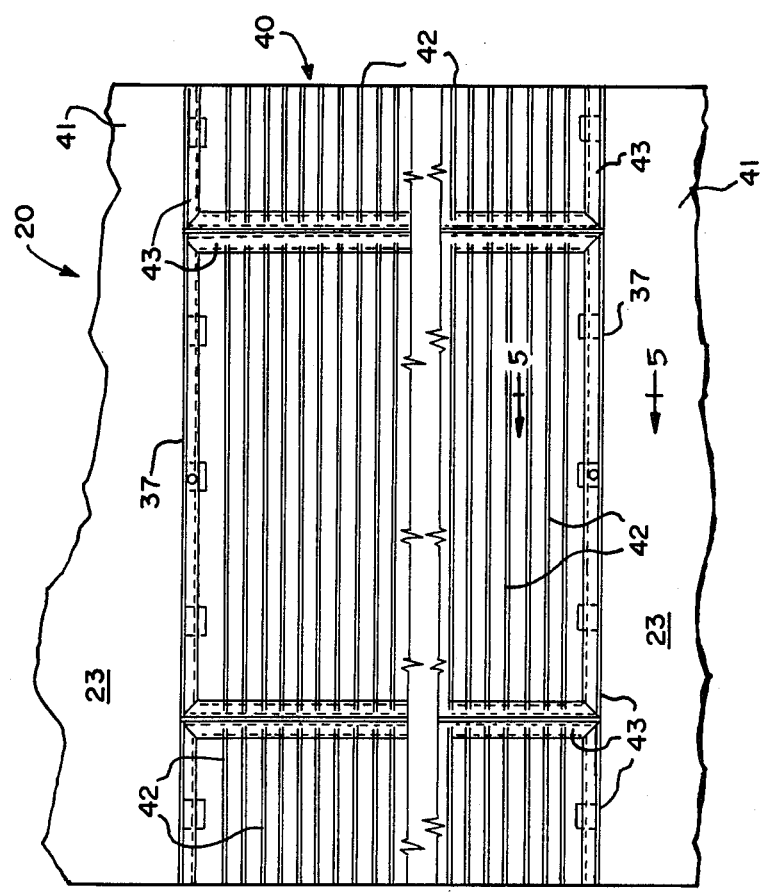

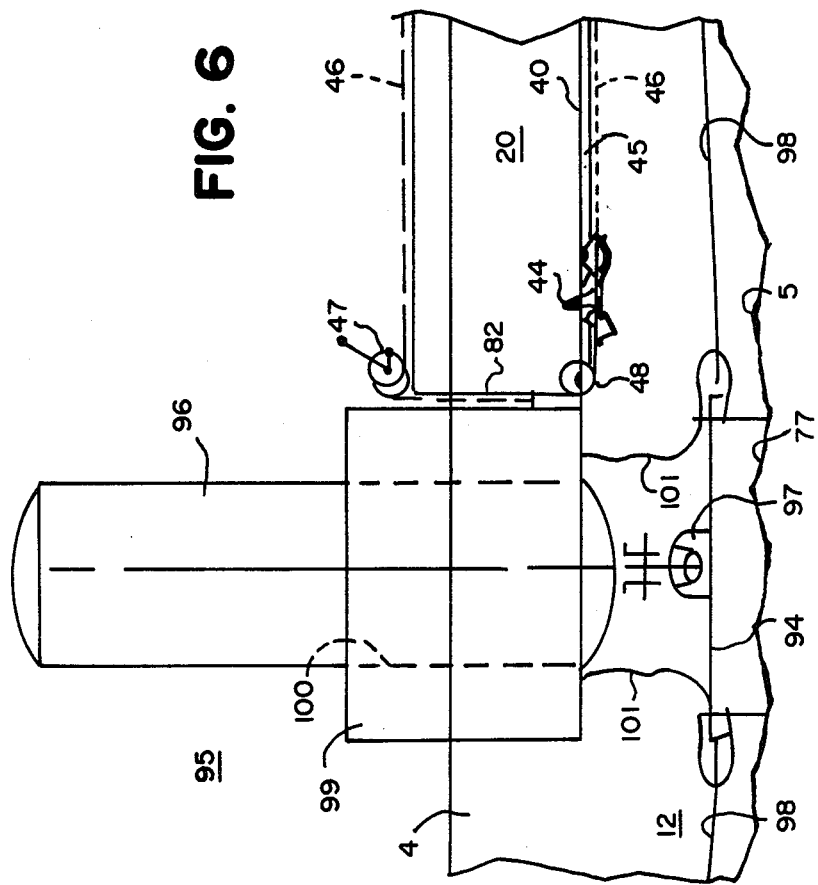

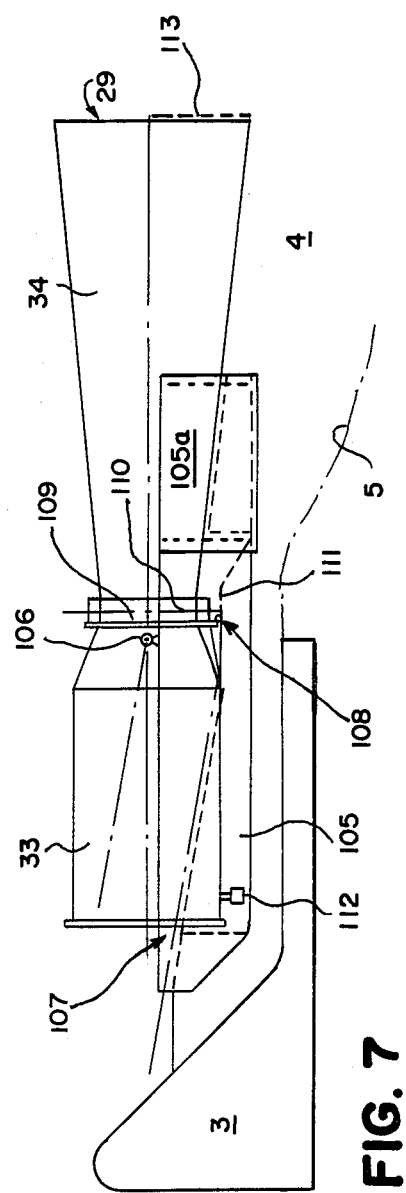
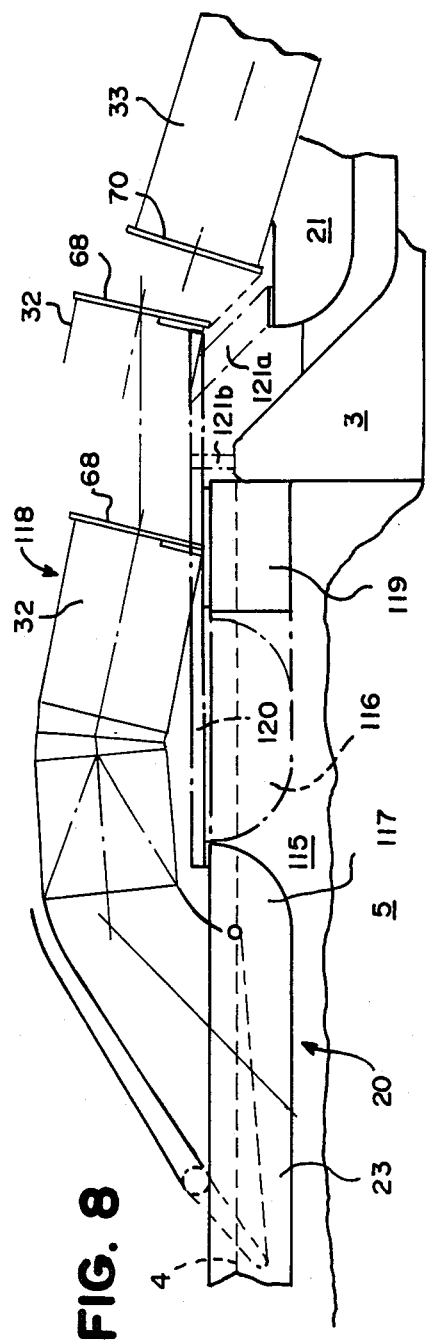
FIG. 7
FIG. 8

APPARATUS FOR THE GENERATION OF HYDROELECTRIC POWER AND METHOD OF MANUFACTURING AND INSTALLING SAME

RELATED CASES

This is a continuation-in-part of prior co-pending U.S. patent application Ser. No. 773,408, filed Sept. 6, 1985, now abandoned, which is itself a continuation of U.S. patent application Ser. No. 597,465, filed Apr. 6, 1984, now U.S. Pat. No. 4,540,313, dated Sept. 10, 1985.

BACKGROUND OF THE INVENTION

The present invention relates generally to hydroelectric power generation, and in particular, to a hydroelectric power generating plant which affords improved versatility and applicability in use and construction.

Ideally, a hydroelectric power generating plant is designed in conjunction with an associated dam so that provision is made for penetration of the dam by the penstocks required to conduct water to the turbines, and so that construction of the plant may take place simultaneously with construction of the dam. However, under certain circumstances, the simultaneous design and construction of a dam and power generating plant is not possible. For example, as a result of recent increases in the demand for power, it has become desirable to retrofit many existing dams and spillways, originally constructed primarily for purposes of flood control, water supply, navigation, and recreation, to now provide a means for generating electric power. Alternatively, many sites which are capable of being dammed to develop a head which is sufficient to generate electric power, are incapable of such use because the cost of constructing the dam and associated power plant by conventional means would not be justified by the expected quantities of power which the resulting installation could produce.

U.S. Pat. No. 4,540,313, the subject matter of which is incorporated by reference as if fully set forth herein, describes the many problems which can be encountered in attempting to retrofit an existing dam, or in attempting to construct a hydroelectric facility as part of a proposed dam which is to be located at a site which offers only marginal productivity, including the environmental and cost considerations which often render such proposed constructions impracticable or unfeasible. Also described is a means for solving these problems in many circumstances, by providing a plant for the generation of hydroelectric power which is to a large extent capable of being manufactured at a remote facility such as a shipyard or the like, and then shipped to the dam site by water. Apart from minimal preparation at the dam site, the majority of the labor required to construct the hydroelectric power generating plant is performed at a facility which is more conducive to reducing costs. Furthermore, modifications to the proposed or the existing dam structure are kept to a minimum. The resulting savings in costs make possible the development of sites which were previously prohibitive to development for hydroelectric power generation.

While serving to significantly increase the number of sites which were available for development, I have found that the basic concept of remotely constructing a hydroelectric facility for transport to a desired site is somewhat limited by the structure of the system proposed in my prior U.S. Pat. No. 4,540,313, in turn limiting the number of dam sites which may be developed using such a system. Primarily, this is because the implementation described in my prior patent is principally intended for use in connection with dams serviced by a lock system for upstream/downstream transport of the barge assemblies. This still leaves for development dam sites which either do not have a lock system, or which have a lock system which is insufficient to receive barges of the type (and size) described in my prior patent. Nevertheless, many such dam sites offer a potential for useful hydroelectric power generation.

It therefore remained desirable to develop a hydroelectric power plant construction which is adaptable to still further installations as previously discussed, while meeting present design requirements and environmental regulations.

SUMMARY OF THE INVENTION

It is, therefore, a primary object of the present invention to provide a hydroelectric power generating plant of improved construction.

It is also an object of the present invention to provide a hydroelectric power generating plant which is adaptable to varied construction site requirements including those involving extisting dams and spillways, as well as for new installations.

It is also an object of the present invention to provide a hydroelectric power generating plant which is adaptable to construction sites having limited accessability.

It is also an object of the present invention to provide a hydroelectric power generating plant which is adaptable to such installations, and which is capable of meeting various environmental requirements relating to the installation site.

It is also an object of the present invention to provide a hydroelectric power generating plant which is capable of providing the foregoing improvements, yet which is sufficiently cost effective to justify the undertaking.

It is also an object of the present invention to provide a hydroelectric power generating plant which is relatively inexpensive and simple in construction, and which is thereafter conveniently serviced.

These and other objects are achieved in accordance with the present invention by providing a hydroelectric power generating plant which comprises a plurality of discrete components capable of remote prefabrication, and subsequent local assembly after transport to the dam site either by water, if possible, or overland by truck or train. To this end, three basic components are provided. A first floating body is provided which is adapted to support a first end of a siphoning penstock, which includes an intake system capable of drawing water to develop the necessary flow and head. A second floating body is provided which is adapted to support a second end of the siphoning penstock, which contains all of the equipment necessary to generate hydroelectric power from a received water flow and head. Each of the floating bodies and the siphoning penstock are adapted for modular, prefabricated construction at a remote facility, and for subsequent transport to the dam site either by water, if possible, or overland by truck or train if such water transport is either not practical or less desirable. After transport to the dam site, the floating bodies are respectively assembled and positioned so as to be above and below the dam, and the siphoning penstock is connected to and between the floating bodies by means of pivotable trunnion supports so that the end which contains the hydroelectric power generating equipment is located downstream of the dam, and so that the end which contains the intake equipment is located upstream of the dam. Thus, the siphoning penstock is attached to and between the floating bodies so that it extends over the dam to develop appropriate fluid communication within the resulting hydroelectric power plant.

In retrofitting an existing dam or constructing a new dam in accordance with the present invention, preparing the work site to receive the power generating plant involves only the construction of suitable moorings for retaining the floating bodies in their desired position, appropriate preparation of the river bed downstream of the dam to receive and accommodate the discharge of water from the siphoning penstock, and to provide facilities for connecting the power from the power generating equipment to a suitable transmission system. Thus, those portions of the installation procedure which impact the dam site are significantly reduced, minimizing the amount of work which must be scheduled at the site, as well as resulting interruptions of the site's normal use.

It will be understood that certain movement may be encountered in connection with such equipment, particularly resulting from changes in river depth, or turbulence encountered as a result of storms, floods, and the like. To accommodate such movement, the floating bodies are preferably secured in position by means of bracketing systems which connect the floating bodies to appropriate fixed moorings in a manner which enables vertical movement of the floating bodies without undue lateral shifting. The trunnion connections for the siphoning penstock serve to accommodate respective movement of the floating bodies without damaging the siphoning penstock as a result of encountered angular displacements.

As a result of the foregoing, the construction of the hydroelectric power generating plant is made significantly less sensitive to differences in site topography. This leads to numerous advantages including enabling the use of standardized and therefore less costly designs, as well as reducing the engineering, reliability testing and licensing required for such installations because of their standardization.

For further detail regarding a preferred embodiment installation produced in accordance with the present invention, reference is made to the following detailed description, taken in conjunction with the following illustrations.

BRIEF DESCRIPTION OF THE DRAWINGS

FIG. 4 is a partial, bottom plan view of a trash rack assembly for the intake of the siphoning penstock.

FIG. 5 is a partial, sectional view of the trash rack of FIG. 4, taken along line 5—5.

FIG. 6 is a partial, side elevational view of an alternative embodiment mooring system, and trash rack scraper mechanism.

FIG. 7 is a side elevational view of a special turbine barge assembly.

FIG. 8 is a side elevational view of a special intake barge assembly.

In the several views provided, like reference numerals denote similar structure.

DETAILED DESCRIPTION OF A PREFERRED EMBODIMENT

Figure 1:
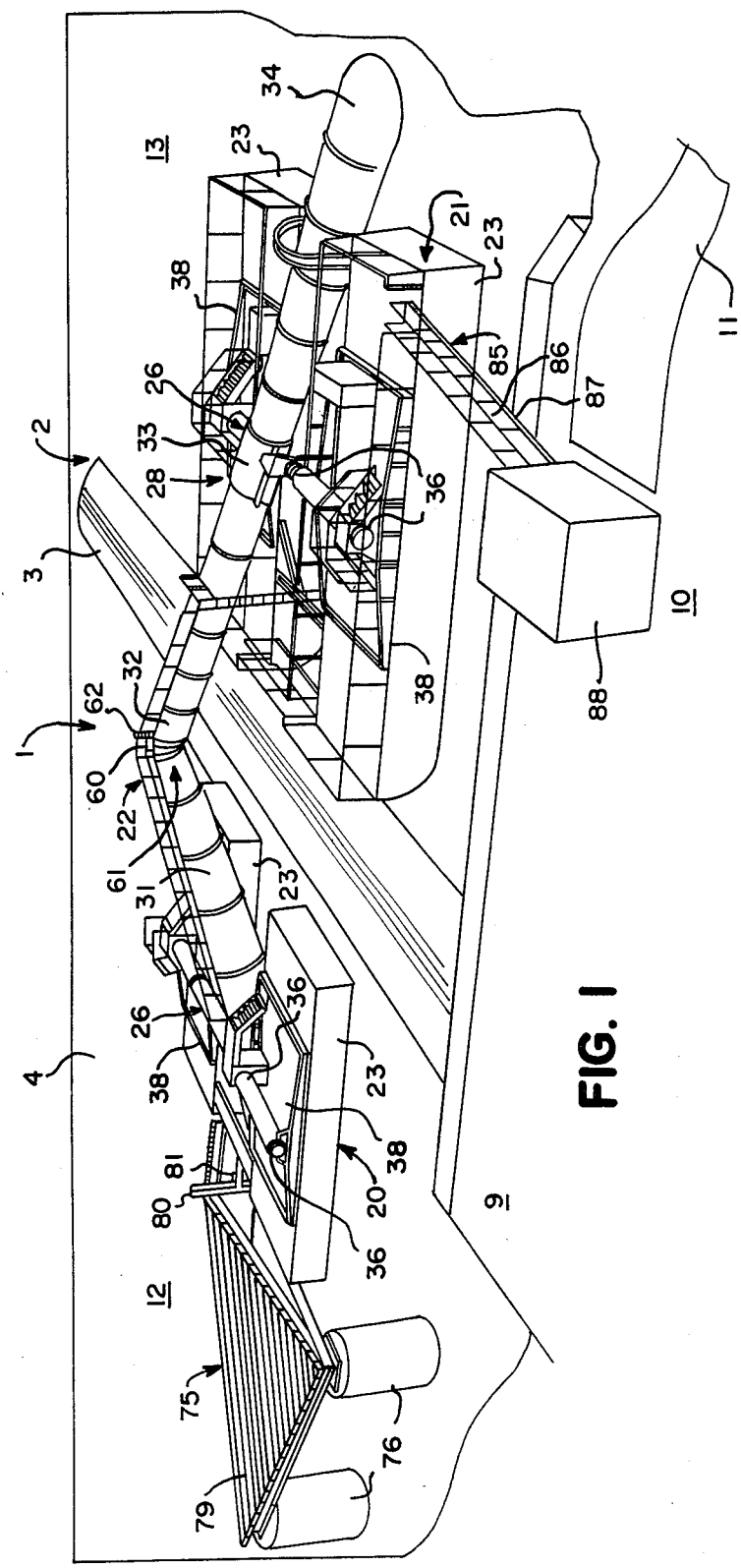
FIG. 1 is an isometric view illustrating a hydroelectric power generating plant in accordance with the present invention, and its manner of assembly.

Although specific forms of the invention have been selected for illustration in the drawings, and the following description is drawn in specific terms for the purpose of describing these forms of the invention, this description is not intended to limit the scope of the invention which is defined in the appended claims.

FIG. 1 generally illustrates an installation of a hydroelectric power plant 1 in accordance with the present invention at an installation site 2 which incorporates a dam 3 spanning the river 4. It will be understood that the exemplary site 2 illustrated in the drawings may represent an existing construction which is to be retrofitted for hydroelectric power generation, or a new construction which is to incorporate a hydroelectric power generating capability. It will also be understood that the exemplary installation site 2 has only been provided for the purposes of generally illustrating a power plant 1 in accordance with the present invention, and that the power plant 1 of the present invention will find general applicability to other sites incorporating different topographies and/or structural configurations.

Turning first to the composition of the dam site 2, it will be seen that the bed 5 of the river 4 has been provided with a dam 3 having an upstream face 7 and an apron or flip bucket 8. The upstream face 7 serves as the primary member of the dam 3, retaining an existing flow of water in desired fashion. The apron or flip bucket 8 serves as a downstream enclosure which prevents erosion of the river bed 5 downstream of the dam 3. The dam 3 extends fully between the shoreline 9 and an opposing shoreline (not shown) of the river 4. Positioned along the shoreline 9 is a facility 10 for mooring and operatively communicating with the hydroelectric power plant 1, and a road 11 for accessing the facility 10. Of course, the above-specified components are conventional, their manner of construction being well understood by a worker skilled in the art of dam and hydroelectric power plant construction. Accordingly, such components, in and of themselves, do not form part of the present invention.

However, it shall now be assumed that the installation site 2 is to be provided with hydroelectric power but that for reasons of safety, environmental considerations, or economics, it is not desirable to modify the construction of the dam 3 in a manner which would enable conventional hydroelectric power construction techniques to be applied. Further, it shall be assumed that the installation site 2 is not appropriately accessed by barges of the type described in my prior U.S. Pat. No. 4,540,313. Primarily, this is because the dam 3 incorporates no lock system. However, it is also possible that the river 4 (the available lock system) may not be navigable by the relatively large, unitary barges described in my prior patent. In any event, to provide the installation site 2 with a hydroelectric facility in accordance with the present invention, the following operational components are provided.

Figure 2:
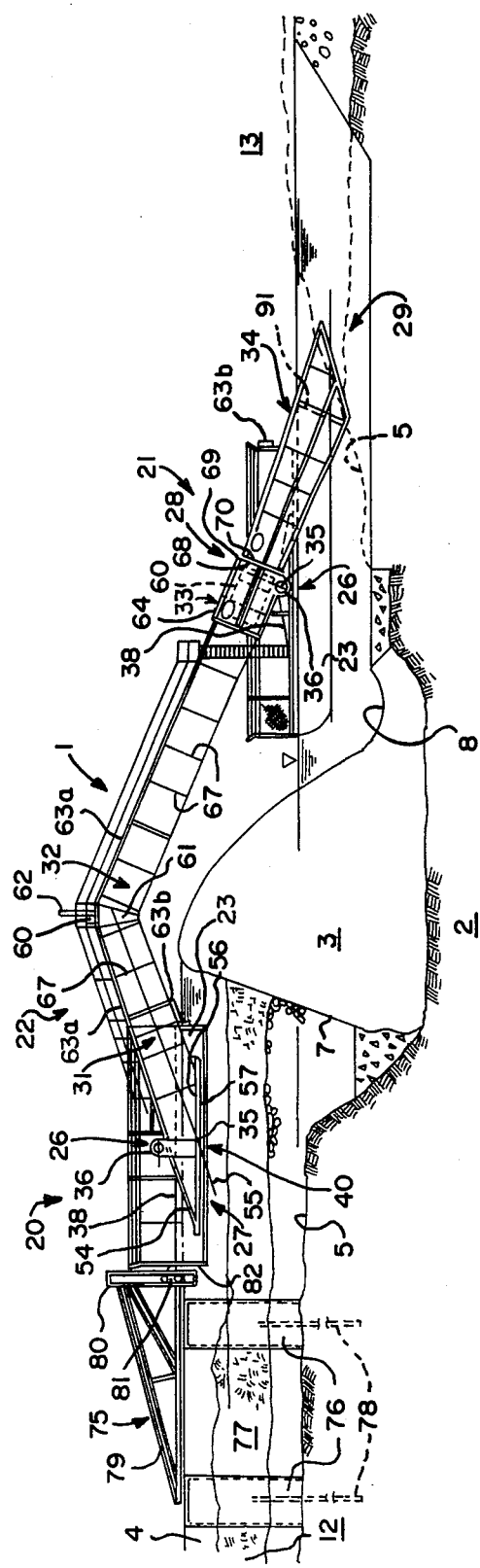
FIG. 2 is a partially sectioned, side elevational view of the hydroelectric power generating plant illustrated in FIG. 1.
Figure 3:
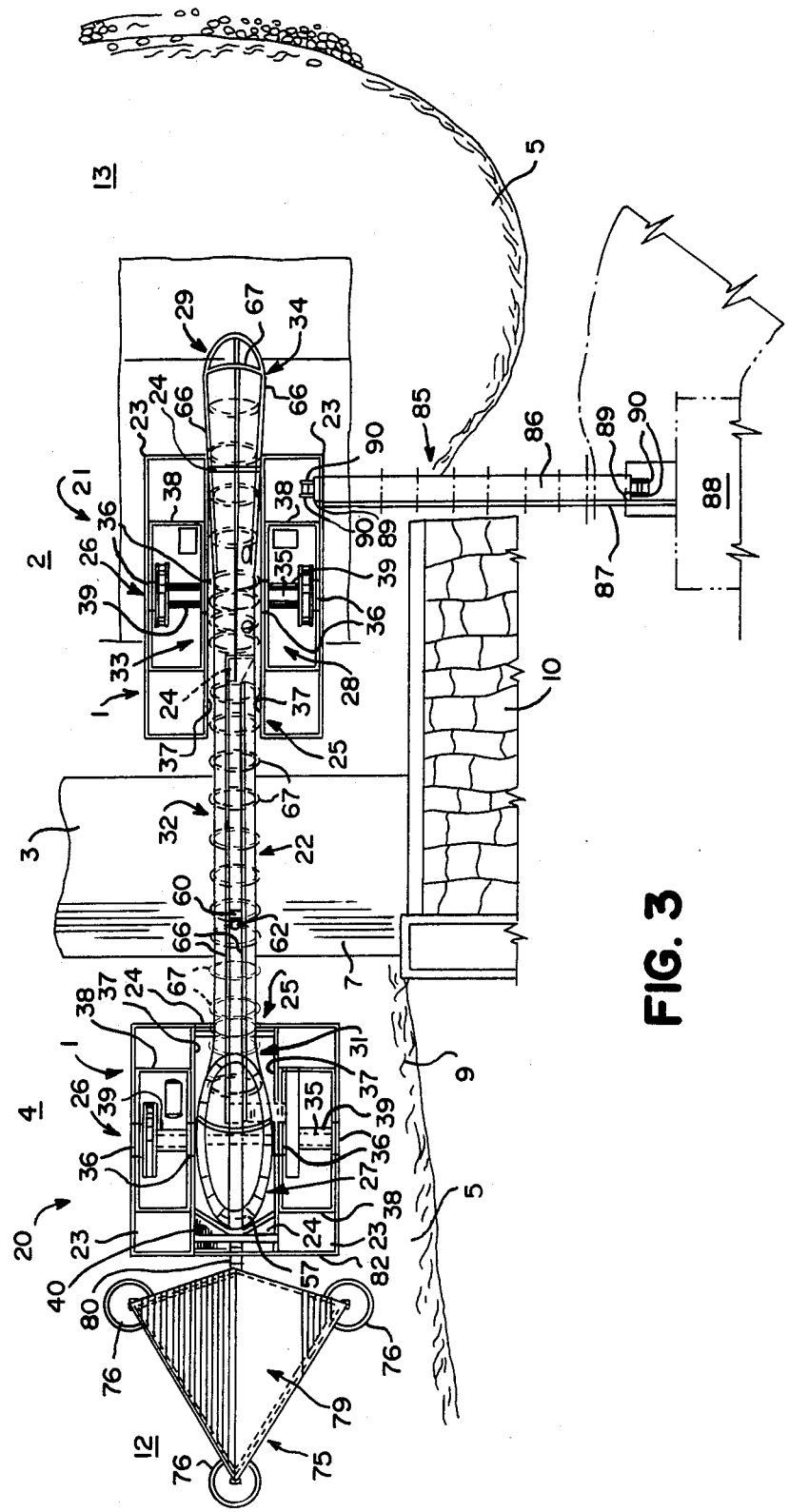
FIG. 3 is a top plan view of the hydroelectric power generating plant illustrated in FIG. 1.

With reference to FIGS. 2 and 3, the hydroelectric power plant 1 generally comprises two floating bodies or barges 20, 21 locatable on opposite sides of the dam 3 and operatively connected with one another by means of a siphoning penstock 22. As is preferred, each of the barges 20, 21 is a pontoon-type barge which is generally comprised of a pair of pontoon sections 23 interconnected by a series of framing elements 24. The framing elements 24 also serve to develop regions 25 between the pontoon sections 23 which are capable of receiving the siphoning penstock 22, preferably by means of a series of trunnion connections 26 as will be described more fully below.

The barge 20 which is positioned within the upstream portions 12 of the river 5 acts to support the intake 27 of the siphoning penstock 22, drawing water for delivery to the power generating equipment which is located within the siphoning penstock 22, at 28, and which is supported by the barge 21 located within the downstream portions 13 of the river 5. Water delivered from the power generating equipment is discharged from the siphoning penstock 22, at the outlet 29. To be noted is that the hollow pontoon sections 23 of the barges 20, 21 are suitable for developing flotation and/or ballast which facilitates trim of the barges 20, 21 upon their installation and during their use, if desired.

The siphoning penstock 22 is generally comprised of four sections in assembled combination including a conical section 31 which includes the intake 27 for the siphoning penstock 22, a transfer section 32 for delivering water received from the intake 27 to a housing 33 for containing the turbine-generator which is used to produce electrical power from the resulting water flow, and a draft tube 34 which defines the outlet 29 for the water which is discharged from the turbine-generator.

As previously indicated, the siphoning penstock 22 is pivotally connected to each of the barges 20, 21 by means of trunnion supports 26, which each generally comprise a rigid pipe 35 attached between the spaced pontoon sections 23 of the barges 20, 21 within a pair of bearing 36 (lubrite or elastomeric) located along the side edges 37 of the pontoon sections 23 of the barges 20, 21, and supported in position by suitable load distribution beams 38 attached over each of the pontoon sections 23. The bearings 36 are preferably located along the side edges 37 of the pontoon sections 23 to provide adequate support for such structure, at a level which is selected so that the load to be supported is located at the center of buoyancy for the barges 20, 21. This is to accommodate vertical displacement of the barges 20, 21, while assuring their lateral stability (trunnion 26 of the barge 20 parallel with the trunnion 26 of the barge 21, to avoid secondary bending stresses in the siphoning penstock 22).

Outer pipe sections 39 having an inner diameter which slightly exceeds the outer diameter of the rigid pipe 35 are provided to overfit the rigid pipe 35, and are welded to appropriate portions of the siphoning penstock 22, with appropriate stiffeners to assure adequate stability and load transfer. The outer pipe sections 39 associated with the barge 20 are connected to the conical section 31 of the siphoning penstock 22, while the outer pipe sections 39 associated with the barge 21 are connected to the turbine housing 33 of the siphoning penstock 22. As a result, the siphoning penstock 22 is permitted to pivot with respect to the barges 20, 21 which support it, to account for variations in river level, without undue lateral shifting.

Water entering the intake 27 of the siphoning penstock 22 is preferably first encountered by a trash rack 40 which extends fully along and between the bottom edges 41 of the pontoon sections 23 which comprise the intake supporting barge 20. As is best shown in FIG. 4, the trash rack 40 is generally comprised of a plurality of spaced bars 42 extending between a frame 43 attached to and between the bottom edges 41 of the pontoon sections 23. The spacings between the bars 42 are selected so that water is permitted to freely enter the intake 27 of the siphoning penstock 22 without drawing debris into the intake 27, or entraining fish or aquatic wildlife within the resulting flow. To this end, it will be noted that the trash rack 40 preferably extends fully along and between the bottoms of the pontoon sections 23 to provide an enlarged working surface which promotes uniform fluid flow of less than acceptable maximum velocity.

In accordance with the present invention, both the intake 27 and the trash rack 40 are specially configured to provide enhanced operation, as follows.

Traditional trash rack configurations are inclined or vertical such that the lower end of the trash rack is deeply submerged while the upper end remains well above normal head water elevations. This arrangement, particularly when inclined, provides a large accessing area such that approach velocities are relatively low and head loss due to water flowing through the trash rack is minimized. However, in accordance with the present invention, it has been found that by installing the trash rack 40 in a horizontal plane, debris tends not to build up on the rack bars 42, particularly during periods of relatively high flow, but rather tends to be washed downstream. Moreover, a horizontally mounted trash rack tends to be protected on all sides by the pontoon sections 23 of the barges 20, 21, as well as by the mooring system for the intake supporting barge 20 which will be described more fully below. As a consequence, debris and ice are generally deflected away from the horizontally disposed trash rack 40. Moreover, a horizontal trash rack can be designed for a lower hydraulic load not only due to its limited submergence, but also due to the reduced likelihood of debris build-up. The resulting area can be conveniently large with even lower velocities and head loss, without substantially added costs. This is because hydraulically, by bringing the water up into the intake 27 the approach velocities are significantly lower due to their coming from 360°. Providing low velocities approaching the trash rack 40 also serves to minimize the tendancy to attract fish, as well as making it easier for fish to swim away from the intake 27.

In connection with traditional trash rack constructions, the inclined or vertical trash racks are generally allowed to extend above head water elevations so that debris can be cleaned from the racks (thereby preventing added head loss) either by hand or by a mechanical rake, and either flushed downstream or carted away. As previously indicated, horizontal trash racks tend not to collect a substantial amount of debris build-up. However, it can reasonably be expected that some debris, particularly leaves and branches, will still catch on the rack bars 42. With reference to FIG. 6, a toothed scraper bar 44 is capable of being provided as a means for dislodging such debris. A series of these scraper bars 44 (one for each trash rack section) are supported at each end within a channel 45 (or angle) located in parallel with the trash rack bars 42. A pair of chains 46 are attached to opposite ends of the scraper bars 44, within the channels 45, and extend about paired driven sprockets 47 and idler sprockets 48 so that rotation of the driven sprockets 47, using a handwheel or a suitable motor drive, causes the scraper bars 44 to move the full length of the rack bars 42. Thus, by drawing the scraper bars 44 back and forth along the bars 42 of the trash rack 40, debris is cleared from the bars 42 and either sinks to the bottom or floats downstream and over the dam 3.

Yet another consideration is that the passage of water through a hydroelectric turbine rather than over a spillway tends to reduce the aeration that would otherwise have occurred. This can result in a reduction of dissolved oxygen downstream of the dam. During hot weather, water temperatures can rise to a point where the dissolved oxygen level may become depleted to such an extent that fish may die, requiring the hydroelectric plant to shut down.

Various means have previously been used to correct this situation, such as the injection of compressed air into the turbine housing, or the opening of special vents provided in the walls of the draft tube which services the turbine housing, to suck air into the water stream. However, in large area installations such as the horizontal trash rack 40 of the present invention, it is very difficult to achieve sufficient penetration of such air streams into the water to cause uniform air distribution. Additionally, there is little time for absorption of the air into the water before the discharge stream exits from the system, with the result that the air tends to form bubbles which escape to the surface rather than being dissolved in the water.

Thus, according to the present invention, and with reference to FIG. 5, an air injection system 50 is provided to actively inject air into the water stream at the intake 27. To this end, the frame 43 of the trash rack 40 is made up of hollow structural tubes provided with a pattern of holes 51 extending through the sidewalls 52 which face the incoming water flow. Compressed air is delivered to these tubular framing members 43, via service tubes 53, at a controlled pressure which permits the volume of injected air to be varied to suit the prevailing flow velocity and temperature conditions. By injecting air at the intake 27 through very small holes, sufficient contact is developed between the tiny air bubbles which result, and the water as it passes through the full length of the siphoning penstock 22, to cause the air to be dissolved to a much greater degree than with ordinary draft tube aspiration.

To be noted is that any excess air can be bled from the siphoning penstock 22 by the vacuum pump (to be described below) for the siphoning penstock 22. It is important for excess air to be removed from the water flow before reaching the turbine, not only because the resulting decrease in density will tend to cause a loss of power, but also because of the potential for cavitation damage to the turbine parts. Consequently, the injection of air at the intake 27 must be carefully monitored and controlled together with operation of the vacuum pump for the siphoning penstock 22, to be sure that free air is not permitted to pass through the transfer section 32 of the siphoning penstock 22 and to the turbine.

Also to be considered is the configuration of the intake 27. Water intakes for hydroelectric plants are typically either vertical or horizontal depending upon the direction of water passage through the turbine. This facilitates horizontal flow from the typical head water or forebay, and minimizes the number of turns which the water must make while flowing into such typical horizontal or vertical water passages. This also accommodates inclined or vertical trash racks, and the typically vertical intake gates and stop logs.

However, in accordance with the present invention, it has been found that by inclining the water passage of the intake 27, the resulting water flow has a reduced bend to make as the siphoning penstock 22 passes over the dam 3, and the approach flows coming primarily from upstream have little or no bends to make. Side flows must still turn 90°, and any flow from downstream will have to make a substantial turn to enter the intake 27. However, these latter volumes are relatively small and therefore only slightly increase losses. Since the approach velocities for the intake 27 are particularly low, these intake losses are minimal.

The inclined collector 31 which follows the intake 27 is preferably conical in shape, with a parabolic (cross-section) entrance 54. This tends to increase the gross intake area, and lower the velocities at the periphery, in turn lowering entrance losses and the tendency to draw air into the system. This also permits less intake submergence than would ordinarily be required by comparable vertical or horizontal intake water passages, reducing the water depth necessary for effective operation.

The core or highest velocities developed at the intake 27 will tend to occur along the intake centerline or axis 55, and furthest from the edges 56. To still further reduce these already low entrance losses, a half pipe section or donut 57 can be constructed along the horizontal edge 56 of the intake 27. Moreover, by tapering the intake 27, a smaller penstock can be used without excessively increasing pipe and elbow losses. Consequently, dead and live (water) loads can be optimized with respect to losses in energy versus increased pipe size and cost.

The inclined water passage of the intake 27 also conveniently enables the trunnion support 26 to be located at a maximum distance upstream, away from the dam crest. This facilitates more economical, longer and narrower barges, with their center of buoyancy further upstream.

Conventional water intakes tend to be open at their upstream end. Consequently, unless a bridge or support structure is constructed, it is difficult to provide fish deterrent devices across this opening. Also, such water intakes tend to be quite subject to damage by debris, either on the surface or when partially submerged. The barge construction of the present invention serves to eliminate the foregoing problems by providing a convenient upstream support platform for peripheral fish deterrent devices, and by providing a number of structures which combine to protect the water intake 27 from damage. For example, fine nets, bubbler systems and/or electrical deterrents can be properly spaced around the periphery of the barge 20, and its mooring system, to discourage fish from entering the intake 27. This is further accommodated by the barge shadow area extending on both sides of the intake 27. The intake 27 is protected on each of its sides by the pontoon sections 23 of the intake supporting barge 20, and along its front by the mooring system for the barge 20. Thus, due particularly to the low velocities produced, and protection from the mooring system, debris is far less likely to become a problem.

Water drawn from the intake 27 of the siphoning penstock 22 enters the transfer section 32 for eventual delivery to the turbine-generator. Initially, water is drawn into the intake 27 of the siphoning penstock 22 by developing a partial vacuum within the transfer section 32, using a vacuum pump 60 which is positioned at the apex 61 of the transfer section 32. A variety of vacuum pump designs may be applied to this purpose. However, because of the manner in which the pump is to be used, the possibility exists for water to get into the pump if the pump is left running for too long a period of time, or if the associated control valves are not closed quickly enough. Vacuum pumps which are capable of passing water without damage or loss of function are therefore preferred for use in such circumstances. Control of the vacuum pump 60 without frequent cycling is achieved by providing a vacuum receiver, and control probes which are activated by changing water levels, positioned in a standpipe 62 connected at the apex 61 of the siphoning penstock 22. As the siphoned water clears the apex 61, a flow is developed within the transfer section 32 which eventually allows further operation of the vacuum pump to be discontinued (flow continuing by siphoning action), except for brief periods of operation needed to remove excess air from the resulting flow of water as previously described in connection with the air injection system 50.

As with most barge systems, it is expected that the barges 20, 21 will be subject to at least some internal water accumulation either from condensation or leakage. At times, the deliberate addition of water may be desirable, for ballast purposes. Sump pumps are conveniently provided to remove accumulated water, as necessary. To provide a back-up for such systems, either in the event of a sump pump failure, or excessive leakage too great for the sump pump to handle, the air compressor of the vacuum pump 60 may be used to evacuate such water accumulations, if desired. This may be accomplished by connecting the compressor to the sump by appropriate piping 63a (and valves), to pressurize the various chambers of the barges 20, 21. This, in turn, enables water accumulations to be forced out and discharged through appropriate drain pipes 63b connecting the various chambers of the barges 20, 21 to the exterior.

The barges 20, 21 must serve to not only support the intake structure, but also to enable limited movement of the supported structure to account for variations resulting from changes in head and flow, and prevailing weather conditions. It has been determined that only minor angular rotation will occur in the fore and aft direction and that there will be virtually no relative transverse rotation between the siphoning penstock 22 and barges 20, 21.

By using the relatively simple and rugged trunnions 26 for supporting both the conical section 31 (intake 27) and the turbine housing 33 on the respective upstream and downstream barges 20, 21, the dead weight (structure) and live (water) loads can be transferred to the center of buoyance of the respective barges while virtually eliminating any ballasting otherwise necessary to adjust the center of buoyancy. Location of the intake trunnion 26 at the furthest extremity upstream of the intake 27 permits a use of long, narrow barges, which are the most economical. Longer and narrower barges also permit larger, higher capacity unit assemblies to be used for the given constraints of any river locks through which such assembles may have to be transported. Location of the turbine supporting trunnion 26 near the most rigid part of the turbine housing 33 permits a more economical structural design, and permits the upper half 64 of the penstock forming the turbine housing 33 and/or the draft tube 34 to be freely removed for direct access to the power generating equipment. Moreover, the trunnions 26 can be economically extended over the full width of the barges 20, 21 so that the resulting loads are uniformly distributed. Conventional self-lubricated bearings 36 at the trunnions 26 permit free vertical movement of either barge with respect to the other as water elevations change due to changes in river flow, wave action, or flood flows. The overall width of the trunnion supports provides adequate lateral stability even though the apex 61 of the siphoning penstock 22 is at a substantial distance above headwater. By using a continuous, laterally rigid waterpassage system, the siphoning penstock 22 is able to transmit barge drag from the downstream barge 21 to the mooring system which secures the upstream barge 20. Reinforcing of the waterpassage system (the penstock) is also simplified and made more reliable.

After passing the apex 61 of the transfer section 32, the resulting water flow is then delivered to the power generating equipment which is positioned within the housing 33, as is generally illustrated in phantom at 65. It will be understood that any of a variety of conventionally available components (e.g. valves, turbines, speed increasers, generators, switchgears, controls, transformers, etc.) may be used in developing the power generating equipment 65 in accordance with known techniques and desired operational parameters. In the example selected for illustration in the drawings, a single turbine-generator-type power generating plant is provided. Although this configuration is preferred in view of its overall simplicity, it will be understood that the number of power generating plants provided, as well as their individual structural makeup, may be varied in accordance with the design parameters which are anticipated in connection with the system under construction.

It will be noted that the barges 20, 21 are located on opposite sides of the dam 3, communicating with one another by means of the siphoning penstock 22. This gives rise to certain special design considerations, as follows.

For example, since the siphoning penstock 22 conveys water drawn from the intake 27 over the dam 3, for delivery to the power generating equipment 65, the construction of the penstock 22 must be of sufficient integrity to support not only the weight of the penstock 22, but also the weight of the water to be carried. Moreover, since a siphoning penstock 22 is provided to draw water over the dam 3, the construction of the penstock 22 must be able to withstand the vacuum or negative pressurized water which is used to start the siphoning action when operation of the hydroelectric power plant 1 is to be initiated. Of course, once the siphoning has been started, the vacuum condition necessary to the continued transfer of water is maintained without further pumping. To support the forces resulting from these considerations, the various sections 31, 32, 33, 34 of the siphoning penstock 22 are provided with axially (66) and radially (67) defined reinforcing ribs, so that the siphoning penstock 22 may be constructed from a broader range of materials while remaining suitable to such design constraints.

Also to be noted is that because the power generating equipment is supported at the turbine housing 33, the draft tube 34 is cantilevered outwardly from a flange 68 positioned immediately upstream of the runner centerline. The turbine side of the flange 68 can most readily be reinforced by ribs attaching the flange to the distributor ring or outer barrel, at 69, and by making this flange substantially oversized in the radial direction. The draft tube 34 includes a runner throat ring 70, and the oversized, upstream flange 68 of the turbine housing 33 thereby provides a useful means for rigidly attaching the draft tube 34 to the turbine housing 33, and for receiving tapered reinforcing ribs located axially (66) and radially (67) along the draft tube 34. Not only is the throat ring 70 reinforced, but the weight of the draft tube 34 is also effectively transmitted via the tapered ribs 66, 67 on the top and bottom to the oversized flanges 68, 70 so that adequate bolting can most readily be accommodated and so that deflection can most easily be controlled.

As a further consideration, it will be understood that various dynamic conditions will develop differences in respective water levels in the upstream and downstream portions of the river which are normally in a particular relative position, but which at other times may even approach the same elevation. It will also be understood that certain extreme weather conditions may give rise to wave action and turbulence in the vicinity of the barges 20, 21. Such conditions will primarily manifest themselves in terms of transient vertical movements of the barges 20, 21, with only a minimal tendency toward lateral shifting of the barges 20, 21, either in the river bed 5 or with respect to one another. To accommodate such occurrences, the trunnion interconnections are provided as previously described. Additional steps are taken to ameliorate such conditions in the design of the moorings 75, 85 which are used to secure the barges 20, 21 in position on opposite sides of the dam 3.

For example, the upstream mooring 75 is designed to maintain the overall power generating plant 1 in a constant location relative to the dam 3 while permitting vertical movement to accommodate changing upstream water surface elevations due to variations in stream flow, up to whatever magnitude of flood return frequency is considered appropriate, as well as reductions below spillway crest during drought periods. The upstream mooring 75 must also withstand horizontal forces due to stream flow, ice pressure, debris impact, and wind load without significant movement. To this end, a plurality of caissons 76 are anchored to the reservoir bottom 77 and, with post tensioned cables 78, receive a mooring superstructure 79. Superstructure 79 includes a vertical track 80, which receives a trolley 81 mounted at the forward edge 82 of the upstream barge 20. Such structure provides the basis for satisfying all of the performance requirements previously described in an economical manner. A sheathing (removed to show construction detail) is preferably placed over the framework of the superstructure 79 to prevent the collection of debris and to provide protection against trespassing by swimmers and boaters.

Alternatively, the upstream mooring may take the form illustrated in FIG. 6 of the drawings. Illustrated is a mooring 95 which makes use of a pylon 96 attached to a base plate 94 by a swivel joint 97, and secured in position on the reservoir bottom 77 by appropriate anchoring lines 98 (either anchored or connected to deadmen on the shoreline 9). A connector assembly 99 associated with the forward edge 82 of the intake supporting barge 20 slidingly engages the pylon 96, at the aperture 100, to complete the mooring connection. Safety chains 101 are advantageously provided as a further precaution.

The downstream mooring 85 is actually provided by a walkway 86 which is designed not only to provide lateral positioning of the barge 21 at water elevations from low flow to flood flows, but also to support the control and power cables 87 which extend from the power generating unit 60 to an on-shore switchgear housing 88 for receiving and transforming power to the desired transmission voltage.

Each end of the walkway 86 is provided with a pin connection 89 that permits both lateral and vertical movements, as well as a limited degree of rotation. In addition, wheels 90 are provided at each connection to provide lateral stability. The vertically oriented pins 89 are designed to withstand lateral loads that may be incurred due to turbulence in discharge over the dam, and cross-currents caused by uneven tailrace configurations and lateral wind loads.

While the foregoing enables free vertical movement of the barges 20, 21, it is to be noted that due to the large differential in vertical displacement of the turbine supporting barge 21 when with and without water in the siphoning penstock 22, the draft tube outlet 29 must be submerged for an excessive amount while the turbine is called into operation. This submergence is increased due to the draft tube outlet 29 being positioned substantially downstream from the trunnion 26. Since the outlet 29 must be submerged when the siphoning penstock 22 is unwatered, so that a vacuum may be developed within the penstock to start the siphoning action for normal operation, a deeper draft tube outlet or tailrace excavation would ordinarily be required, at greater cost. To eliminate this problem, an airtight hinged flap 91 is provided at the top of the draft tube outlet 29 so that the flap 91 extends at least below tailwater while the turbine/penstock is unwatered. As a result, the siphoned flow can be started without the need for deeper initial submergence of the outlet 29, and the resulting extra excavation. To reduce the friction losses which would develop if the outlet velocity had to hold the flap 91 open, the flap 91 is preferably counter-weighted or actually positioned by a hydraulic cylinder, a piston, or other similar actuating mechanism. In addition to the above-described improvements, the flap 91 provides the added benefit of a smoother tailrace resulting from the flap when opened to a horizontal position.

Having described the various components which comprise the hydroelectric power plant 1, an exemplary installation of the power plant 1 will now be described. Although it will be understood that the power plant 1 of the present invention will operate in connection with any of a variety of different installations, it shall be assumed for the purposes of discussion that an existing dam 3 is to be retrofitted with hydroelectric power, and that the dam 3 does not include a lock system.

To take advantage of their modular construction, the components of the barges 20, 21 and the siphoning penstock 22 would preferably be manufactured at some remote location which is deemed convenient, such as a boatyard or other existing manufacturing facility where labor and materials are readily available and accessible. Thus, the use of conventional manufacturing techniques may be applied to what had previously required tailored, on-site construction techniques, enabling the use of standardized designs for many different applications. The pontoon sections 23 which comprise the barges 20, 21 are preferably constructed of steel or concrete, and are capable of being freely dimensioned so long as the resulting construction is capable of being transported into location as will be described more fully below.

On-site preparation for the installation essentially involves only appropriate construction of the caissons 76 (or pylon 96) at locations ahead of the anticipated mooring for the upstream barge 20, and the construction of the switchgear housing 88, unless the existing structure of the dam 3 and river bed 5 calls for special on-site modifications to correctly receive the power plant 1. For example, it may be necessary to prepare the river bed 5, at 13, to accommodate the increased depth of the draft tube 34, and to withstand the increased water flow which can be expected as a discharge from the draft tube outlet 29. This latter preparation generally involves suitable excavation of the river bed, at 13, and the placement of stones or other durable materials along the excavation to accommodate the anticipated increase in water flow.

Once the site 2 has been prepared and the various components comprising the power plant 1 have been constructed, the barges 20, 21 are conveniently transported to the site 2. The system described in my prior U.S. Pat. No. 4,540,313 describes a single, integral barge at the intake and another single, integral barge for the turbine, each of which is custom designed and manufactured for the proposed application. In some cases this is justified, and particularly advantageous for special barge installations or where there are special constraints on width and/or length and/or depth. However, in other cases it may not be cost effective to produce such custom units, or the lock system necessary to transport such units to the site to be developed may not be available. This is particularly so for the larger units.

To reduce costs, provide greater lateral stability, and expedite construction, the present invention makes use of a modular contruction which preferably includes at least two upstream pontoon sections 23 and two downstream pontoon sections 23 to support, respectively, the collector 31 and the turbine housing 33. For smaller units, these barge assemblies can even be accomplished using standard work platforms. In any event, the resulting modular units can be combined to form larger and longer or wider assemblies, as needed, to form the basis for larger power generating installations without unduly increasing the size of its basic components, accordingly simplifying the transport of such components to the site to be developed. Furthermore, in addition to enabling maximum use of standard commercial barge components, greater lateral stability is provided by using two separated units which span the intake and turbine, respectively. The separate components of the assembly also improve flotation security, in the same manner as would the compartments in a single barge.

In accordance with the present invention, an intake barge assembly (comprised of components for use in developing the barge 20, and possibly including the siphoning penstock 22) and a turbine barge assembly (comprised of components for use in developing the barge 21, and possibly including the turbine to be used for power generation) are transported to the prepared site 2 by means which are appropriate depending upon the configuration (size and type) of the installation and the available transport conditions. If a navigable waterway is available, transport by water is generally the most preferred. The modular construction of the power plant 1 enables even relatively large installations to be broken down for acceptance by the available lock systems. If water transport is impracticable, particularly in the event that the waterway is not navigable (e.g., no available lock system), the various components of the system may be transported overland, by truck or train.

Once at the site 2, the various components are positioned as follows. First, the pontoon sections 23 of the barge 20 and the pontoon sections of the barge 21 are deployed on opposite sides of the dam. This may be accomplished either by lock, if available, or if transported by truck or train, by placing the proper units on the proper side of the dam 3 using an appropriate crane (note that a land-based crane may be used for this purpose, as distinguished from the more expensive barge-based cranes). Second, the barges 20, 21 are placed in proper position to receive the siphoning penstock 22. Third, the components of the siphoning penstock 22 are assembled. To this end, the trunnion pipes 35 are passed through the outer pipe sections 39 of the conical section 31 and the turbine housing 33 (if not already assembled as part of the barge assemblies), and connected to the distribution beams 38. Temporary supports and ballast may be used, as needed, to maintain penstock alignment and barge trim prior to installation of the transfer section 32, to complete the assembly The draft tube 34, if not already in place, is then attached to the turbine housing 33. At an appropriate point in this procedure, the assembled barges 20, 21 are moored to the superstructure 79 (or pylon 96) and the shoreline 9, as previously described, and connections are made to the switchgear housing 88. The foregoing steps are advantageously facilitated by land-based cranes, or other appropriate riggings, which are transportable to the site either by road (road 11) or water (river 5).

For the smaller installations, the above advantages enable the use of standard commercial barges located on either side of the penstock to support the hydraulic turbine, as well as the intake 27. However, for larger units, the combined width of the various components of the barge assemblies 20, 21 can become greater than the limits imposed by navigation. Moreover, due to its length and weight, the siphoning penstock 22 might have to be transported separately from the barge assemblies, complicating final assembly of the power plant 1. Still other problems are presented for units which are to be located away from shore since, to install such units, special, expensive to rent barge-mounted cranes would have to be used to install the siphoning penstock 22 over the dam 3.

In such cases, assembly of the power plant 1 is facilitated by the use of special barge configurations including a turbine barge assembly 105, such as is shown in FIG. 7, and an intake barge assembly 115 such as is shown in FIG. 8.

The turbine barge assembly 105 takes advantage of the fact that while the turbine assembly is being transported to its position below the dam 3, it is unwatered and therefore requires less buoyant support. Consequently, a narrowed transport barge may be used to provide adequate displacement for the unwatered turbine assembly, while permitting adequate lock passage. In the event that additional displacement is necessary for a particular configuration, an additional flotation body 105*a* may be provided if desired. The special transport barge 105 must also accommodate the physical shape of the turbine and associated draft tube 34, and must be compatible with the pontoon sections 23 required for operational displacement and stability. To this end, the transport barge 105 preferably supports the turbine housing 33 and attached draft tube 34 on trunnions 106, and includes a depression or well 107 for receiving the turbine assembly when in an essentially horizontal position. This depression/well 107 is preferably sealed at its downstream end 108 by rubber seals located between a turbine seal plate 109 and the sides 110 and curved floor 111 of the transport barge 105.

This, therefore, permits the turbine housing 33 and draft tube 34 to be tilted by jacks 112 positioned on the upstream end of the barge 105, to develop the proper angle required to match up with the transfer section 32 which would be extended downstream from above the dam 3. Temporary, adjustable alignment devices may be used for initial connection of the turbine housing 33 to the transfer section 32 as it is extended over the dam 3, to help guide the two sections together so that their associated flanges can be bolted together.

Since the draft tube 34 will inherently overhang the special transport barge 105, the draft tube 34 may also be used for added buoyancy by providing a bulkhead 113 at the draft tube outlet 29. This bulkhead may be temporary, or may serve as the flap 91 which is used to initially seal the draft tube outlet 29 when the system is unwatered.

Upon reaching the site 2, the pontoon sections 23 which are to ultimately form the turbine supporting barge 21 are preferably attached to either side of the centrally positioned transport barge 105 by conventional latches or pin devices, so that the hydraulic load will be carried by the center of buoyancy of all three barge sections (23, 105) without the need for any draft tube displacement while the trunnion connection 26 is developed at the turbine housing 33. Once the pontoon sections 23 are attached, the draft tube outlet 29 can be uncovered, and the turbine housing 33 and the draft tube 34 can be tilted in preparation for connection to the intake.

The intake barge assembly 115 makes use of a special barge 116 (which may even be used as one of the turbine supporting pontoon sections 23) removably connected to the rear edge 117 of the assembled intake supporting barge 20. The special barge 116 is adapted to support overhanging portions 118 of the siphoning penstock 22 during transport to the installation site 2, and during assembly of the transfer section 32, as follows.

Upon placement of the intake supporting barge 20 above the dam 3, the special barge 116 would be extended from the intake supporting barge 20 by turning the special barge 116 through an angle of 90°, as shown in FIG. 8 at 119. Thereafter, the special barge 116 would be positioned close to the dam 3, and the intake supporting barge 20 would be winched closer to the special barge 116, causing the siphoning penstock 22 to extend over the crest of the dam 3 with the added support of a special track 120 extending from the intake supporting barge 20 and over the special barge 116. Eventually, the turbine supporting barge 21 can be used to pick up the penstock weight, using a special bracket 121a which receives the penstock 22 while the special barge and track are removed (or returned for another unit to be assembled). A bracket 121b can also be provided at the crest of the dam 3, for similar purposes. The special brackets 121a, 121b serve to help align the flanges 68, 70 so the the turbine housing 33 can be bolted to the transfer section 32, to complete the siphoning penstock 22. Ballasting of the barges 20, 21, 116 may also be used for this purpose. In this manner, only a special support and track are needed to complete penstock assembly, which are re-usable on other units, and only one connection needs to be made in the field, achieving savings in time and cost.

To be noted is that following installation, subsequent servicing of the barges 20, 21 may be accomplished either at the site 2, or if major servicing is indicated, by detaching and again transporting the barge requiring service to a remote facility which is more conveniently capable of such servicing. This is simply accomplished by reversing the foregoing steps.

It will therefore be seen that the foregoing apparatus and method of assembly serve well to satisfy each of the objectives previously set forth. It will also be understood that the foregoing apparatus and method of assembly are capable of variation without departing from the spirit and scope of the present invention. Many such variations have been referred to previously. It will therefore be understood that various changes in the details, materials and arrangement of parts which have been herein described and illustrated in order to explain the nature of this invention may be made by those skilled in the art within the principle and scope of the invention as expressed in the following claims.

What is claimed is:

1. An apparatus for generating hydroelectric power in association with damming means spanning at least portions of a fluid flow, said apparatus comprising:
   a first body adapted for floating and located adjacent to and upstream of said damming means, said first floating body supporting means for withdrawing fluid from said fluid flow;
   a second body adapted for floating and located adjacent to and downstream of said damming means, said second floating body supporting means for generating said power in response to a received water flow and head; and
   penstock means having respective ends attached to and extending between portions of the first floating body and portions of the second floating body so that said fluid withdrawing means is placed in fluid communication with said power generating means, and so that fluid withdrawn by said fluid withdrawing means is capable of being delivered over the damming means to said power generating means to develop said water flow and head.

2. The apparatus of claim 1 wherein said damming means is a dam retaining a water flow.

3. The apparatus of claim 1 wherein said damming means is a spillway spanning a water flow.

4. The apparatus of claim 1 wherein said first and said second floating bodies are barges comprised of paired pontoon sections.

5. The apparatus of claim 4 wherein the pontoon sections of said barges are separated by a space for receiving portions of said penstock means.

6. The apparatus of claim 5 wherein said penstock means is received between said pontoon sections by trunnion means extending between said pontoon sections and engaging said penstock means.

7. The apparatus of claim 6 wherein said trunnion means includes a rigid shaft extending between said pontoon sections and received within a pair of bearings operatively associated with said pontoon sections, and a concentric pipe slidingly overfitting said shaft and attached to said penstock means.

8. The apparatus of claim 7 wherein said concentric pipe extends substantially fully between said pontoon sections.

9. The apparatus of claim 7 wherein said rigid shaft extends substantially fully across said barge.

10. The apparatus of claim 7 wherein said rigid shaft is located at the center of buoyancy of the barge.

11. The apparatus of claim 5 wherein a trash rack extends between the lowermost edges of the pontoon sections of a first one of the barges, to prevent debris, fish and aquatic wildlife from entering the space defined between said pontoon sections.

12. The apparatus of claim 11 wherein said trash rack is comprised of a plurality of generally horizontally disposed bars contained within a frame attached to and between the pontoon sections of said first barge.

13. The apparatus of claim 12 wherein said first barge supports said fluid withdrawing means.

14. The apparatus of claim 12 wherein said trash rack incorporates means for injecting air into said fluid.

15. The apparatus of claim 14 wherein said air injecting means includes a plurality of apertures formed in hollow framing members comprising said frame, and means for supplying compressed air to said hollow framing members.

16. The apparatus of claim 15 wherein said apertures extend fully about said frame.

17. The apparatus of claim 12 wherein said trash rack incorporates means for scraping debris from the bars of said trash rack.

18. The apparatus of claim 17 wherein said scraping means includes a scraper bar for mating with the bars of said trash rack, and means for drawing said scraper bar along said trash rack bars.

19. The apparatus of claim 18 wherein said drawing means includes channels for slidingly receiving said scraper bar, drive chains for engaging said scraper bar, sprockets for receiving said drive chains, and means for rotating said sprockets to reciprocate said drive chains so that said scraper bar is reciprocated within said channels.

20. The apparatus of claim 5 wherein said penstock means includes an intake section for withdrawing said fluid from said fluid flow, a transfer section for conveying said fluid over said damming means, a housing for containing the means for generating said hydroelectric power responsive to fluid received from said transfer section, and a draft tube for discharging fluid from said power generating means.

21. The apparatus of claim 20 wherein said intake section is inclined from the direction of flow of said fluid.

22. The apparatus of claim 21 wherein said intake section is generally conical.

23. The apparatus of claim 22 wherein said intake section has a parabolic entrance.

24. The apparatus of claim 21 wherein the periphery of said intake section terminates in a semi-circular section.

25. The apparatus of claim 21 wherein said intake section is received for support by a first one of said barges.

26. The apparatus of claim 20 wherein said transfer section is an inverted, generally V-shaped section, defining an apex for passing fluid to said hydroelectric power generating means.

27. The apparatus of claim 26 wherein a vacuum pump is positioned at said apex.

28. The apparatus of claim 27 wherein said vacuum pump is capable of passing fluid.

29. The apparatus of claim 26 wherein said vacuum pump operates responsive to control probes for sensing water levels, positioned at said apex.

30. The apparatus of claim 26 wherein said barges include flotation/ballast means in operational association therewith.

31. The apparatus of claim 30 wherein said vacuum pump functions as a compressor, and wherein said flotation/ballast means includes drain pipes for enabling fluid communication from the interior of said pontoon sections to the exterior, and supply pipes operatively connecting said compressor to the interior of said pontoon sections to evacuate collected fluid from said interior, through said drain pipes.

32. The apparatus of claim 20 wherein said housing is received for support by a second one of said barges.

33. The apparatus of claim 32 wherein said draft tube is removably connected to said housing.

34. The apparatus of claim 20 wherein said draft tube includes a flap which is hinged at the top of the discharge for the draft tube, and which is adapted to close when the penstock means is empty of fluid, and to open when a fluid flow is developed within said penstock means.

35. The apparatus of claim 20 wherein a first one of said barges is adapted to support the intake section and the transfer section of said penstock means, and wherein said first barge incorporates means for extending said transfer section from said first barge and over said damming means.

36. The apparatus of claim 35 wherein said extending means includes a temporary barge attached adjacent to downstream edge portions of said first barge, and a track attached between and extending over portions of said first barge and portions of said temporary barge.

37. The apparatus of claim 36 wherein said temporary barge is pivotably and extendably connected to said track.

38. The apparatus of claim 37 wherein said track is configured to slidingly receive and support said transfer section.

39. The apparatus of claim 20 wherein a transport barge supports the housing containing said power generating means, and wherein said transport barge is adapted to receive the pontoon sections which define the barge for supporting said housing and said contained power generating means.

40. The apparatus of claim 39 wherein said transport barge includes means for rotating said housing from a transport position to an operative position.

41. The apparatus of claim 39 wherein said transport barge includes auxiliary flotation means for added displacement.

42. The apparatus of claim 41 wherein said auxiliary flotation means is a floating body temporarily positioned adjacent to downstream portions of said transport barge.

43. The apparatus of claim 41 wherein said auxiliary flotation means is a bulkhead enclosing at least portions of said draft tube.

44. The apparatus of claim 1 wherein said first floating body is retained in position by mooring means comprising a plurality of caissons fixed in position ahead of said first floating body, a superstructure attached to and between said caissons, and bracket means for securing said first barge to said superstructure.

45. The apparatus of claim 44 wherein said bracket means is capable of slidingly engaging said first floating body to said mooring means so that vertical motion of said floating body is enabled and lateral motion of said floating body is inhibited.

46. The apparatus of claim 45 wherein said bracket means is a track and a trolley received in said track, connected between said superstructure and said first floating body.

47. The apparatus of claim 1 wherein said first floating body is retained in position by mooring means comprising a pylon fixed in position ahead of said first floating body, and a connector for slidingly receiving said pylon and attached to said first floating body.

48. The apparatus of claim 47 wherein said pylon is slidingly received by said connector so that vertical motion of said first floating body is enabled and lateral motion of said first floating body is inhibited.

49. The apparatus of claim 1 wherein said second floating body is retained in position by mooring means comprising a rigid connector extending between the second floating body and an adjacent shore.

50. The apparatus of claim 49 wherein said rigid connector is attached to the second floating body and the shore by pins for permitting relative rotation of said rigid connector, and wheels for permitting longitudinal movement of said rigid connector.

51. A method for constructing a hydroelectric power generating means in association with a damming means spanning at least portions of a fluid flow, said method comprising the steps of:
   constructing a first body adapted for floating and for supporting means for withdrawing fluid from said fluid flow;
   constructing a second body adapted for floating and for supporting means for generating said power in response to a received head;
   constructing mooring means for securing said first and second floating bodies adjacent to said damming means;
   positioning said first and second floating bodies adjacent to and on opposite sides of said damming means, and mooring said first and second floating bodies in position; and
   attaching penstock means to and between said first and second floating bodies, and over said damming means, so that said fluid withdrawing means is placed in fluid communication with said power generating means;
   whereby fluid withdrawn from said fluid flow by said fluid withdrawing means is delivered to said power generating means to develop said head.

52. The method of claim 51 wherein at least one of said floating bodies is a modular barge which is constructed remotely from said damming means, and wherein said method further comprises the step of transporting said remotely constructed barge from said remote location to said damming means.

53. The method of claim 52 wherein both of said floating bodies are modular barges which are constructed remotely from said damming means.

54. The method of claim 52 wherein said transporting is accomplished over land.

55. The method of claim 52 wherein said transporting is accomplished over water.

56. The method of claim 55 wherein said damming means incorporates lock means for passing shipping between upstream and downstream portions of said fluid flow, and wherein said method further comprises the step of passing said transported barge through said lock means in conjunction with said positioning.

57. The method of claim 51 wherein said first floating body is moored to caisson means positioned in said fluid flow and spaced from said damming means.

58. The method of claim 57 wherein said second floating body is moored to shore portions adjacent to said damming means.

59. The method of claim 51 wherein said floating bodies are floated adjacent to said damming means, and wherein said method further comprises the step of accommodating changes in displacement of said floating bodies relative to changes in fluid level of said fluid flow.

60. The method of claim 59 wherein said accommodating is accomplished at the moorings for the . floating bodies.

61. The method of claim 59 wherein said accommodating is accomplished at the connections of said penstock means to said floating bodies.

62. The method of claim 51 wherein said fluid is withdrawn from said fluid flow by siphoning.

63. The method of claim 51 which further comprises the step of preparing said damming means for the positioning of said floating bodies.

64. The method of claim 63 wherein said preparing includes excavating an area adjacent to said damming means which is to receive the second floating body.

65. The method of claim 64 wherein said second floating body supports fluid discharge means associated with said penstock means, and wherein said excavation receives said fluid discharge means during said positioning.

66. The method of claim 51 wherein said floating bodies are comprised of separate pontoon sections, and wherein said method further comprises the step of assembling said pontoon sections prior to said mooring step.

67. The method of claim 66 wherein said assembling includes the assembly of trunnion connections for receiving the portions of said penstock means to be supported by said floating bodies.

68. The method of claim 66 wherein said assembling includes:
   providing a track for receiving said fluid withdrawing means, attached to and extending between said first floating body and a temporary barge positioned downstream from said first floating body;
   rotating said temporary barge from said first floating body and toward said damming means;
   positioning said temporary barge adjacent to said damming means; and
   pulling said first floating body toward said temporary barge, extending said track and said fluid withdrawing means out from said first floating body and over said damming means.

69. The method of claim 66 wherein said assembling includes providing a transport barge for supporting said power generating means, and attaching said pontoon sections to said transport barge to form said second floating body.

* * * * *